United States Patent [19]

Girod et al.

[11] Patent Number: 5,712,809
[45] Date of Patent: Jan. 27, 1998

[54] METHOD AND APPARATUS FOR PERFORMING FAST REDUCED COEFFICIENT DISCRETE COSINE TRANSFORMS

[75] Inventors: Bernd Girod, Spardorf, Germany; Staffan Ericsson, Brookline, Mass.

[73] Assignee: Vivo Software, Inc., Waltham, Mass.

[21] Appl. No.: 332,535

[22] Filed: Oct. 31, 1994

[51] Int. Cl.$^6$ .................................................. G06F 17/14
[52] U.S. Cl. .................................................. 364/725
[58] Field of Search ............................ 364/725–726; 382/250

[56] References Cited

U.S. PATENT DOCUMENTS

| | | | |
|---|---|---|---|
| 4,717,962 | 1/1988 | Moore | 358/260 |
| 5,128,757 | 7/1992 | Citta et al. | 358/133 |
| 5,301,136 | 4/1994 | McMillan, Jr. et al. | 364/725 |
| 5,365,469 | 11/1994 | Mercy | 364/726 |
| 5,539,836 | 7/1996 | Babkin | 364/725 |

FOREIGN PATENT DOCUMENTS

| | | | |
|---|---|---|---|
| 0429778A2 | 6/1991 | European Pat. Off. | G06F 15/62 |
| 0429778A3 | 6/1991 | European Pat. Off. | G06F 15/64 |
| WO95/22807 | 8/1995 | WIPO | G06T 9/00 |

OTHER PUBLICATIONS

Gertner, I., "A New Efficient Algorithm to Compute the Two-Dimensional Discrete Fourier Transform", IEEE Trans. on Acoustics, Speech, and Signal Processing, vol. 36, No. 7, Jul. 1988, pp. 1036–1050.

Cham, Wai-kuen, et al., "A 2-D Integer Cosine Transform Chip Set and its Application", IEEE Transactions on Consumer Electronics, vol. 38, No. 2, May 1992, New York, US, pp. 43–47.

DeNatale, Francesco G.B., et al. "Adaptive DCT for Image-Data Compression", European Transactions on Telecomm. and Related Technologies, vol. 3, No. 4, Jul./Aug. 1992, Milano, IT, pp. 49–56.

"Applying Digital Signal Processing", Electronics World + Wireless World, vol. 97, No.1677, Aug. 1992 Sutton, Surrey, GB pp. 669–672.

"3-to-1 Scaling in the DCT Domain", Research Disclosure, No. 345, 1 Jan. 1993, p. 77.

Y. Chan and W. Siu, Short Communication, An Approach to Subband DCT Image Coding, Journal of Visual Communication and Image Representation 5(1), 1994, 95–106.

Primary Examiner—Tan V. Mai
Attorney, Agent, or Firm—Wolf, Greenfield & Sacks, P.C.

[57] ABSTRACT

A method is provided for performing a fast 3-coefficient Discrete Cosine Transform (DCT) in a software implementation. The method provided exploits symmetries and statistical properties of the coefficients found in the DCT. As a result of the symmetries and statistical distribution of coefficients typically found in the DCT of typical images in image processing applications, the 3-coefficient DCT may be readily performed using as few as three input sample values from an input image block. The method selects the samples from locations in the image block where they are at peaks of the basis functions for the coefficients included, thus maximizing noise immunity. The method also provides for switching between performing the 3-coefficient DCT and a full (or other) DCT as required by image quality. Finally, the method may be generalized to perform a reduced coefficient DCT of any number of coefficients less than all coefficients in a complete output block.

15 Claims, 5 Drawing Sheets

METHOD AND APPARATUS FOR PERFORMING FAST REDUCED COEFFICIENT DISCRETE COSINE TRANSFORMS

CROSS-REFERENCE TO RELATED APPLICATION

This application is directed to subject matter related to the inventor's earlier application Ser. No. 08/125,590, filed Sep. 23, 1993 and incorporated herein by reference.

FIELD OF THE INVENTION

The present invention relates generally to the field of digital image processing systems, in particular image processing systems implemented in software. More specifically, the present invention relates to fast implementations of the discrete cosine transform (DCT) suitable for embodiment in software.

BACKGROUND

In the context of the present invention, an image is a two-dimensional visual representation, wherein each point within the image may have associated therewith one or more characteristics. For example, for a monochrome image, each point may have associated therewith a luminance value. For a color image, each point may have associated therewith a red intensity, a blue intensity and a green intensity. Common image presentation technologies include printed photographic still images, movie images, television images, and computer images. Computer technology has now begun to open whole new areas of image presentation, such as high realism video games, electronic books, and others yet to reach commercialization. These latter forms of image presentation all use digital images. That is, images which are stored in digital, and usually binary, form.

Digital image signals are formed by first dividing a two-dimensional image into a grid. Each picture element, or pixel, in the grid has associated therewith a number of visual characteristics, such as brightness and color. These characteristics are converted into numeric form. The digital image signal is then formed by assembling the numbers associated with each pixel in the image into a sequence which can be interpreted by a receiver of the digital image signal.

One reason that these emerging technologies have not appeared sooner is that uncompressed digital image signals contain vast amounts of information, requiring vast quantities of storage space. Furthermore, moving uncompressed digital image signals from one user to another requires a large communication bandwidth to accommodate the large amount of information in a reasonable period of time. The old saw that a picture is worth a thousand words woefully underestimates the problem. Suppose that for a monochromatic (e.g., black and white) image 256 shades of gray are sufficient to represent a uniform luminance scale ranging from black to white. Each pixel occupies eight bits (binary digits) of storage. Thus an image created for display on a typical personal computer screen having a resolution of 640×480 pixels occupies a total of 307,200 bytes. That is the storage equivalent of approximately 100 pages of single-spaced text. Extrapolating, a color image can occupy three times that storage space.

In view of the tremendous pressure that the use of images places on storage requirements, there has been a great deal of research into image compression techniques. The ISO 10918-1 JPEG International Standard/ITU-T Recommendation T.81 has emerged as a result of this research. The standard is reproduced in Pennebaker and Mitchell, *JPEG: Still Image Data Compression Standard*, New York, Van Nostrand Reinhold, 1993, incorporated herein by reference. One compression technique defined in the JPEG standard, as well as other emerging compression standards, is discrete cosine transform (DCT) coding. Images compressed using DCT coding are decompressed using an inverse transform known as the inverse DCT (IDCT). An excellent general reference on DCTs is Rao and Yip, *Discrete Cosine Transform*, New York, Academic Press, 1990, incorporated herein by reference. It will be assumed that those of ordinary skill in this art are familiar with the contents of the above-referenced books.

It is readily apparent that if still images present storage problems for computer users and others, motion picture storage problems are far more severe, because full-motion video may require up to 60 images for each second of displayed motion pictures. Therefore, motion picture compression techniques have been the subject of yet further development and standardization activity. Two important standards are ISO 11172 MPEG International Standard and ITU-T Recommendation H.261. Both of these standards rely in part on DCT coding and IDCT decoding.

Given that processing digital image signals using DCT coding provides the desired degree of compression, the pressure on industry is now to find the fastest method by which to perform the DCT and IDCT. This application is particularly concerned with fast DCT methods. As in the field of compression generally, research is highly active and competitive in the field of fast DCT implementation. Researchers have made a wide variety of attempts to exploit the strengths of the hardware intended to implement the DCT by exploiting symmetries found in the transform and inverse transform. For example, Chen, Smith and Fralick proposed an early fast technique, in their paper "A Fast Computational Algorithm for the Discrete Cosine Transform," *IEEE Transactions on Communication*, COM-25(9), pp 1004–1009, September 1977. A scaled one-dimensional, 8-element DCT (1D 8-DCT) that requires only five multiplications and twenty-eight additions and subtractions was proposed in Arai, Agui and Nakajima, "A Fast DCT-SQ Scheme for Images," *Transactions of the IEICE*, E71(11), p. 1095, November 1988. However, these proposed techniques benefit greatly from implementation in special-purpose hardware. Implementations exclusively in software are only just now beginning to appear. One particularly fast DCT implementation in software is disclosed in the above-referenced U.S. patent application Ser. No. 08/125,580.

It is desired to implement these functions in software, because to do so reduces hardware costs. Specialized hardware embodying a software DCT could be made more flexible than an all-hardware implementation. Software which could run on a conventional personal computer (PC), without special hardware, could eliminate the cost of such hardware entirely. This may be especially advantageous in fields such as video teleconferencing, where the participants are already likely to have access to PCs. A video teleconference system could be implemented at a fraction of the cost of prior art special-purpose hardware.

Nevertheless, fast software DCT implementations continue to suffer, relative to their hardware cousins, due to the unusual demands placed on the computer by the required arithmetic operations, particularly multiplications. Therefore, it is a goal of the present invention to improve the speed at which software can process digital image signals using DCTs.

SUMMARY OF THE INVENTION

In accordance with one aspect of the present invention, there is provided a method for performing in a computer executing a sequence of instructions, a 3-coefficient discrete cosine transform on a block of N×N image samples, each image sample represented by a sample value. The method comprises the steps of: summing in a processing unit (PU) such as an arithmetic logic unit or a central processing unit of a PC the sample values of a Sth row of sample values in the block to form a value $S_{RS}$; summing in the PU the sample values of an Tth row of sample values in the block to form a value $S_{RT}$; summing in the PU the sample values of a Uth column of sample values in the block to form a value $S_{CU}$; summing in the PU the sample values of an Vth column of sample values in the block to form a value $S_{CV}$; and forming in the PU linear arithmetic combinations of substantially only the sums $S_{RS}$, $S_{RT}$, $S_{CU}$ and $S_{CV}$ to form coefficients $C_{00}$, $C_{01}$ and $C_{10}$, all other coefficients, $C_{mn}$, being set to zero.

A number of variations of this aspect of the present invention are possible. The method of this aspect of the invention may further comprise the step of: selecting S, T, U and V to reduce noise in the formation of the coefficients $C_{00}$, $C_{01}$ and $C_{10}$. Furthermore, the Sth row may be a first row, the Tth row may be an Nth row, the Uth column may be a first column and the Vth column may be an Nth column. The step of forming the linear arithmetic combination may further comprise the steps of forming the coefficient $C_{00}=k_{00}\cdot(S_{RS}+S_{RT}+S_{RU}+S_{RV})$; forming the coefficient $C_{01}=k_{01}\cdot(S_{RU}-S_{RV})$; and forming the coefficient $C_{10}=k_{10}\cdot(S_{RS}-S_{RT})$, wherein $k_{00}$, $k_{01}$ and $k_{10}$ are scaling factors. Finally, suitable values for the scaling factors are $k_{00}=\frac{1}{4}$ and $k_{01}=k_{10}=21/64$, when N=8 S=U=1 and T=V=8.

According to another aspect of the present invention, there is provided another method for performing, in a computer executing a sequence of instructions, a reduced coefficient discrete cosine transform on a block of N×N image samples, each image sample represented by a sample value. The method comprises the steps of: selecting K sample values, K<N×N, from among the sample values in the block; and forming in the computer a linear arithmetic combination of substantially only the K sample values to form L coefficients where L<=K.

The method of this aspect of the invention is also subject to variations. For example, the step of forming may further comprise the steps of: forming in the computer at least L sums from subsets of the K sample values; and forming a further linear arithmetic combination of substantially only the L sums to form the L coefficients.

There is provided, according to yet another aspect of the present invention, yet another method of performing in a computer executing a sequence of instructions, a discrete cosine transform on an input block of N×N image samples, each image sample represented by a sample value. The method according to this aspect of the invention comprises the steps of: performing in the computer a reduced coefficient discrete cosine transformation on the input block to form L of N×N first coefficients; filling the N×N–L first coefficients not formed with a value of zero; performing in the computer an inverse discrete cosine transformation on the formed first coefficients to form a reconstructed block; comparing the input block with the reconstructed block; and if an error value obtained by comparing the reconstructed block with the input block is not less than a predetermined threshold, performing in the computer an N×N coefficient discrete cosine transform on the input block to form second coefficients; and if the second coefficients are formed, outputting the second coefficients, but otherwise outputting the first coefficients.

Variations on this aspect of the present invention include those wherein the step of obtaining an error value by comparing further comprises the step of: determining a mean-squared difference between sample values in the input block and corresponding samples in the reconstructed block; or of determining a mean absolute difference between sample values in the input block and corresponding samples in the reconstructed block; or of determining a maximum difference between sample values in the input block and corresponding samples in the reconstructed block; or of determining a power function of differences between sample values in the input block and corresponding samples in the reconstructed block. Further variations of this aspect of the invention may include a step of quantizing the first coefficients immediately prior to the step of performing in the computer an inverse discrete cosine transformation thereon.

In yet another aspect of the present invention, there is provided a method of performing, in a computer executing a sequence of instructions, a discrete cosine transform on an input block of N×N image samples, each image sample represented by a sample value. The method comprises the steps of: (1)(a) if a metric (i.e., a measurement of some attribute) of the input block is less than a first predetermined threshold, performing in the computer a reduced coefficient discrete cosine transformation on the input block to form coefficients; (b) otherwise performing in the computer an N×N coefficient discrete cosine transform on the input block to form the coefficients; and (2) outputting the coefficients.

This aspect of the present invention may be varied as follows. The metric of the input block may be a root-mean-square of sample values in the input block, a variance of sample values in the input block or a standard deviation of sample values in the input block. Other, similar metrics may be employed. Finally, according to another variation, if the metric is less than a second predetermined threshold, the second predetermined threshold being less than the first predetermined threshold, skipping steps (1)(a), (b) and (2) for the input block.

Embodiments of the invention will now be discussed in connection with the Figures.

BRIEF DESCRIPTION OF THE DRAWING

Like reference numerals indicate like elements in the Figures, in which.

DETAILED DESCRIPTION

The present invention will be better understood in view of the following description, read in connection with the figures.

Figure 1:
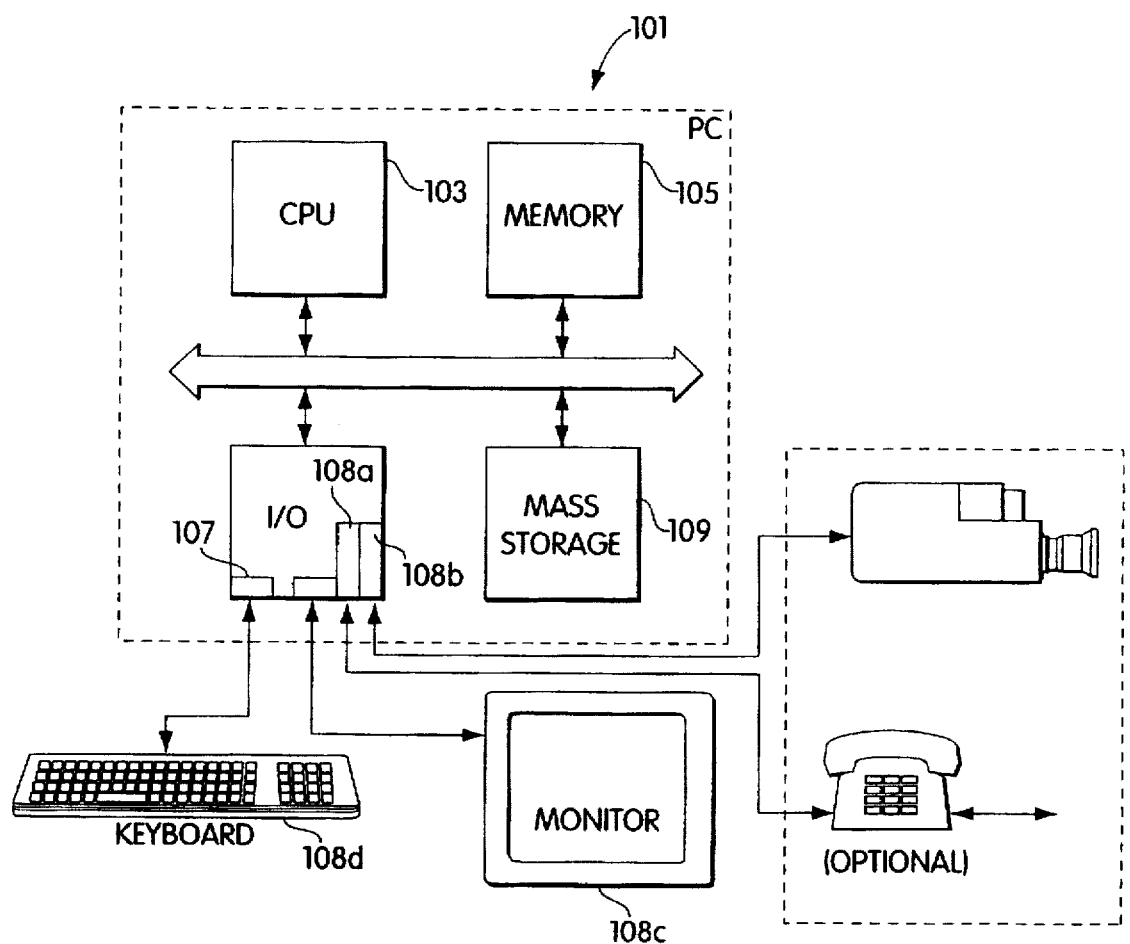
FIG. 1 is a block diagram of a computer system suitable for practicing the present invention.

Some embodiments and variations disclosed herein are intended to be implemented in the form of software running on a personal computer (PC), configured substantially as shown in FIG. 1. However, the specific hardware configuration is not a limitation of the present invention. Indeed, the invention could be embodied in a sequence of instructions executed by other types of general-purpose computers, parallel processing computers or embodied in special-purpose integrated circuits. However, the PC configuration of FIG. 1 illustrates general hardware parameters suitable for practicing the invention, without unduly complicating the detailed explanation thereof.

Referring to FIG. 1, the PC 101 includes a processing unit, generally a central processing unit (CPU) 103, memory 105, input/output (I/O) system 107 and mass storage 109. These are now briefly discussed, before turning to the software of the present invention.

The CPU 103 should preferably be of a type having an internal precision and register size of at least sixteen bits, such as the Intel X86 family or Motorola 680X0 devices. The minimum processing speed is not a critical parameter, but may be chosen by the skilled designer. Naturally, differences in processing speed will have a direct effect on the performance of different systems.

In other embodiments the processing unit could be an ALU, a digital signal processor or other suitable device. A suitable device is a processing unit capable of performing the functions described below, under software program control.

Having sufficient quantities of memory 105 available in the PC 101 will also have a direct impact on system performance. It is contemplated that the invention may be practiced using operating system/interface configurations such as Microsoft MS-DOS/Windows or IBM OS/2, both of which require several Mbytes of RAM (1 Mbyte=$2^{20}$ bytes). The incremental RAM required by embodiments of the present invention is small.

Data and digital signals of various kinds may be passed into or out of PC 101 through I/O system 107. An extremely wide variety of devices may be included in I/O system 107. The devices of I/O system 107 allow digital image signals to be received into or transmitted out of PC 101. For example, I/O system 107 may include a modem 108a for sending digital signals or receiving digital signals or data from remote devices and computers. Such digital signals could include digital image signals. Another possible I/O device is a frame grabber 108b, which could be used to introduce into PC 101 television or video images which have been converted to digital form. Of course, I/O system 107 may include such conventional I/O devices as a monitor 108c, keyboard 108d and printer (not shown), which may be desirable.

Programs, data and digital signals which need to be stored on a more permanent basis than permitted by the RAM portion of memory 105 are stored in a mass storage device 109. The mass storage device 109 may be a hard disk, an optical disk, a CD-ROM or any permanent storage device having similar characteristics to the devices mentioned.

Image signals are received into the PC 101 through one of the devices of I/O system 107. Once inside the PC 101, the image signals will have been converted to digital form. That is, they are digital image signals. In this embodiment, it is presumed that the digital image signals are to be either stored in a mass storage device 109 or transmitted to another location via one of the I/O devices of the I/O system 107. One example of this is where the PC 101 is part of a conferencing network in which images are to be exchanged, stored and displayed on a plurality of such machines. Of course, it will be understood that the above-described architecture of PC 101 is generic and need not be limited to personal computer embodiments. The architecture, illustrated in FIG. 1 is intended to represent all similar architectures including a processing unit, memory, I/O system, etc.

The methods and apparatus next described relate primarily to a portion of the compression operation in accordance with ITU-T H.261, mentioned above, in which discrete cosine transforms are performed on image blocks.

One property of transformed image blocks exploited by the IDCT disclosed in U.S. patent application Ser. No. 08/125,580 is that often most of the coefficients are zero. In fact, the inventors have observed that in 60–70% of all 8×8 image blocks processed under the H.261 standard, all but the first three coefficients—$C_{00}$, the DC coefficient; $C_{01}$, the first horizontal AC coefficient; and $C_{10}$, the first vertical AC coefficient—are zero. This property is exploited in accordance with one aspect of the present invention, in which a DCT is performed in which only three coefficients are obtained: $C_{00}$, $C_{01}$ and $C_{10}$. The remaining 61 coefficients are set to zero.

Figure 3:
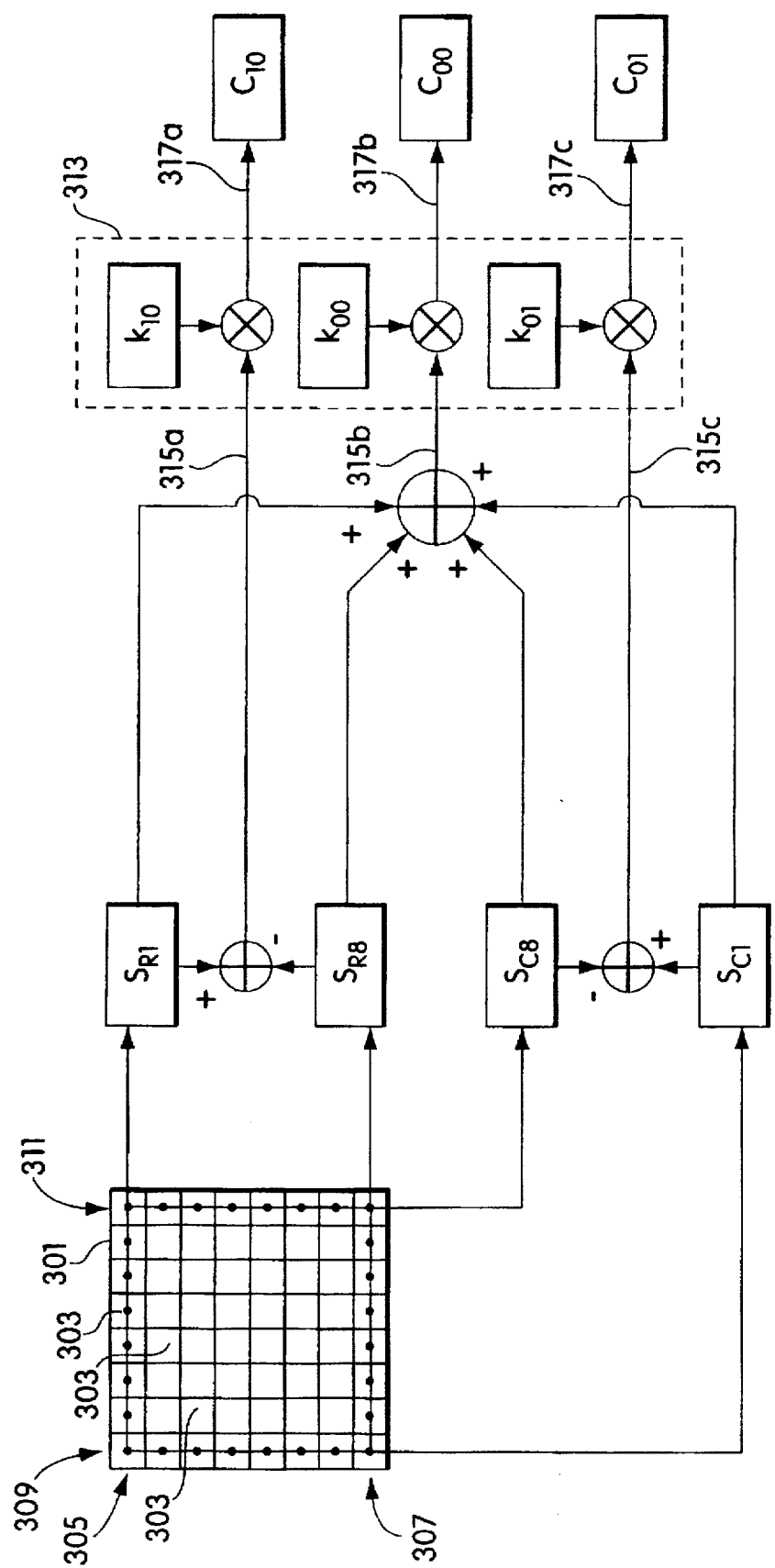
FIG. 3 is a signal flow diagram showing a fast reduced coefficient DCT including the first three coefficients of the DCT.

A method according to this first aspect of the invention is now described in connection with performing 2D 8×8-DCTs as shown in FIG. 3. A digital image signal is received into memory (FIG. 1, 105) and divided into input blocks 301 of 8×8 input signal sample values 303 which are subsequently transformed.

The CPU of the PC is used to sum the values of the image samples contained in the first row 305 of the input block to form the sum $S_{R1}$. Similarly, the values contained in the 8th row 307 of the input block are summed to form the value $S_{R8}$. Finally, the values contained in the 1st and 8th columns 309 and 311 of the input block are summed to form, respectively, values $S_{C1}$ and $S_{C8}$. The three DCT coefficients $C_{00}$, $C_{01}$ and $C_{10}$ are then formed from the following linear arithmetic combinations of the sums previously formed:

$$C_{00}=k_{00}\ (S_{R1}+S_{R8}+S_{C1}+S_{C8});$$

$$C_{01}=k_{01}\ (S_{C1}-S_{C8});\text{ and}$$

$$C_{10}=k_{10}\ (S_{R1}-S_{R8}),$$

where the scaling factors $k_{00}$, $k_{01}$ and $k_{10}$ are selected to provide whatever scaling may be desired. In one embodiment, the scaling factors used are $k_{00}=\frac{1}{4}$ and $k_{01}=k_{10}=\frac{21}{64}$. Thus, $k_{00}$ is realizable as a shift operation performed by the processing unit, for example, the CPU (FIG. 1, 103), while $k_{01}$ and $k_{10}$ are realizable as integer multiplies and shifts performed by the processing unit, for example, the CPU (FIG. 1, 103). References herein to the CPU should be taken generally to include other processing units, as described above.

In an alternate embodiment, the scaling 313 may be realized by using a table look up. In such an embodiment, a table of multiplied values is held in memory and a value to be multiplied 315a–315c is used by the CPU as an index into the table, in order to obtain a multiplied value 317a–317c. In a related embodiment, the scaling factors may be incorporated into quantizer tables that would normally be applied to the transform coefficients before outputting them.

It should now be apparent to those skilled in the art that the inventive principles embodied in the 3-coefficient DCT described above may be applied to other reduced coefficient DCTs, where a reduced coefficient DCT is any approximation of a discrete cosine transform which computes from fewer than all of the input samples only a subset of coefficients including less than all of the coefficients required to completely represent a transformed input block. The coefficients computed for a reduced coefficient DCT will generally be the lower order coefficients. However, any desired set of coefficients may be computed. The remaining, coefficients are set to zero.

The proper formation of the coefficients of a reduced coefficient DCT is achieved by the proper selection of sample values to use in a linear arithmetic combination to form the coefficients. In the 3-coefficient DCT described above, the samples selected included all input sample signal values contained in the rows and columns at the edges of the input block (FIG. 3; 305, 307, 309 and 311). This selection of input signal sample values includes those sample values representative of the maximum positive and negative values of the basis functions represented by the three coefficients $C_{00}$, $C_{01}$ and $C_{10}$. Therefore, the sample values selected tend to provide the most noise-immune information from which to estimate the three coefficients desired.

In general, for an L-coefficient reduced coefficient DCT, only K input signal sample values are required where $N \times N > K >= L$. The L coefficients may be estimated from a linear arithmetic combination of properly chosen input signal sample values. Choosing the K input signal sample values to lie substantially on peaks of the basis functions represented by the L coefficients improves the noise immunity of the computation. Furthermore, the use of more than L input signal sample values, but less than all the input signal sample values in an input block further improves the noise immunity of the computation. If $K=L=N \times N$, a full DCT is performed.

Some input blocks may not lend themselves to successful representation by a reduced coefficient DCT. Use of the above-described 3-coefficient DCT may lead to subjectively annoying artifacts, when indiscriminately applied. Some input blocks may require more than the first three DCT coefficients, in order to be represented accurately. Therefore, in accordance with a second aspect of the present invention, the above-described 3-coefficient DCT is applied only to input blocks which may be represented adequately by the first three coefficients, while other blocks are represented by greater numbers of coefficient values obtained using a conventional DCT method, the DCT method disclosed in the above-referenced U.S. patent application Ser. No. 08/125,590, or a reduced coefficient DCT producing more than three coefficients. Of course, the selective switching method described below may use any reduced coefficient DCT in place of the 3-coefficient DCT discussed below. Likewise, in place of references to full DCTs, below, higher coefficient reduced coefficient DCTs may be used.

Figure 5:
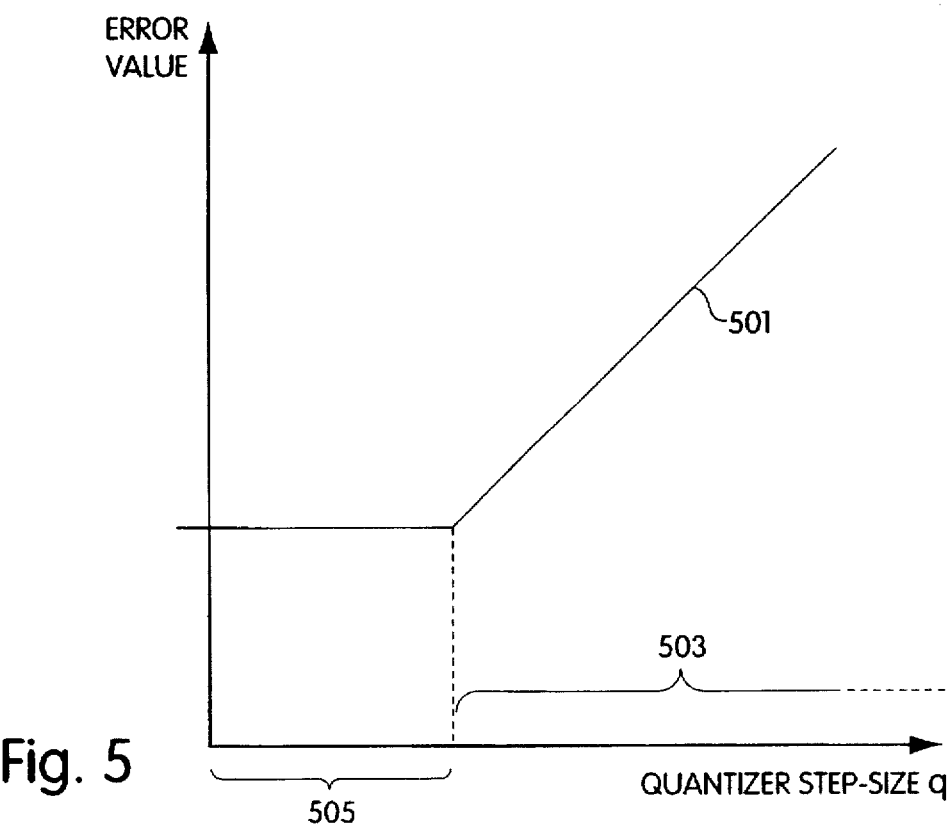
FIG. 5 is a graph of a threshold which varies with quantizer step size.
Figure 4:
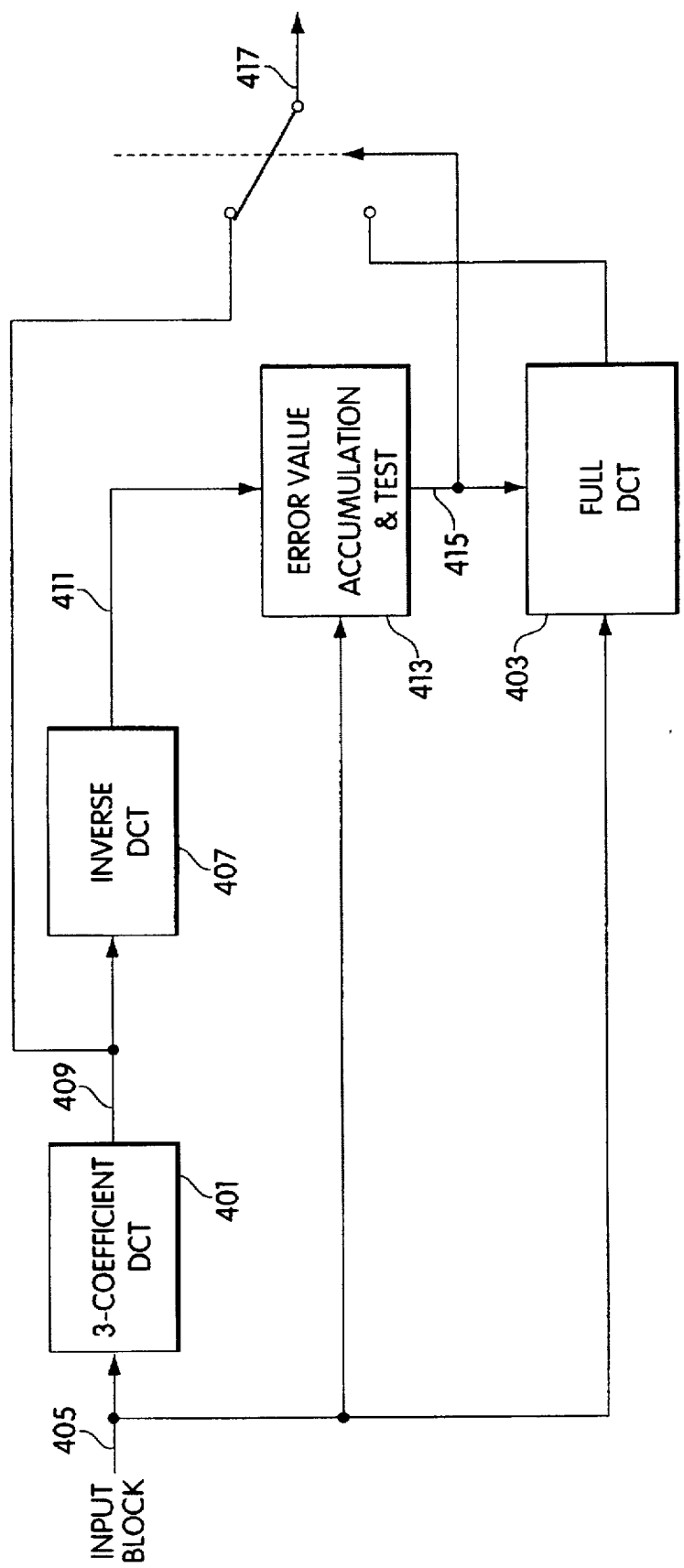
FIG. 4 is a block diagram showing selectively switching between a reduced coefficient DCT and a full DCT.

As shown in FIG. 4, one method to switch selectively between the fast 3-coefficient DCT 401 and a full DCT 403 is first to apply the 3-coefficient DCT 401 to all input blocks 405. An inverse DCT 407 is then applied to the three coefficients 409 to produce a reconstructed block 411 including reconstructed signal sample values. An IDCT method such as one of those described in application Ser. No. 08/125,580 is particularly suitable in order to exploit the fact that all but three coefficients are zero. An error value indicative of differences between the original input block 405 and the reconstructed signal 411 is then accumulated 413. A wide variety of error measures are suitable, such as computations of the mean-squared-error, the mean absolute error, and the maximum error magnitude. Differences between all input signal sample values and corresponding reconstructed signal sample values may be considered, or a fixed subset of such differences may be considered. If the error value is smaller than a predetermined threshold (FIG. 2, T2), the fast 3-coefficient DCT is used, otherwise a conventional full DCT is applied to the input block. The result of this error value test 415 controls operation of the full DCT 403 and of the output 417. As shown in FIG. 5, the predetermined threshold T2 501 is preferably selected as a function of the quantizer step-size q. It may be proportional to quantizer step-size over a range of coarse step sizes 503, but may be constant for fine quantization step sizes 505, as illustrated in FIG. 5.

Figure 6:
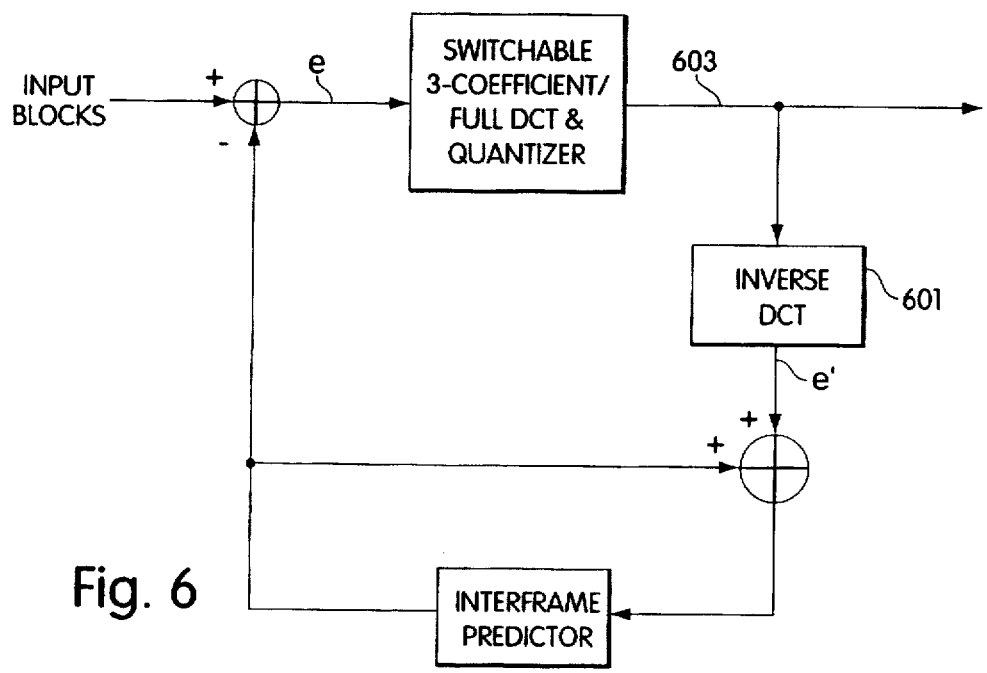
FIG. 6 is a block diagram of another apparatus for selectively switching between a reduced coefficient DCT and a full DCT, including quantization of the coefficients produced.
Figure 7:
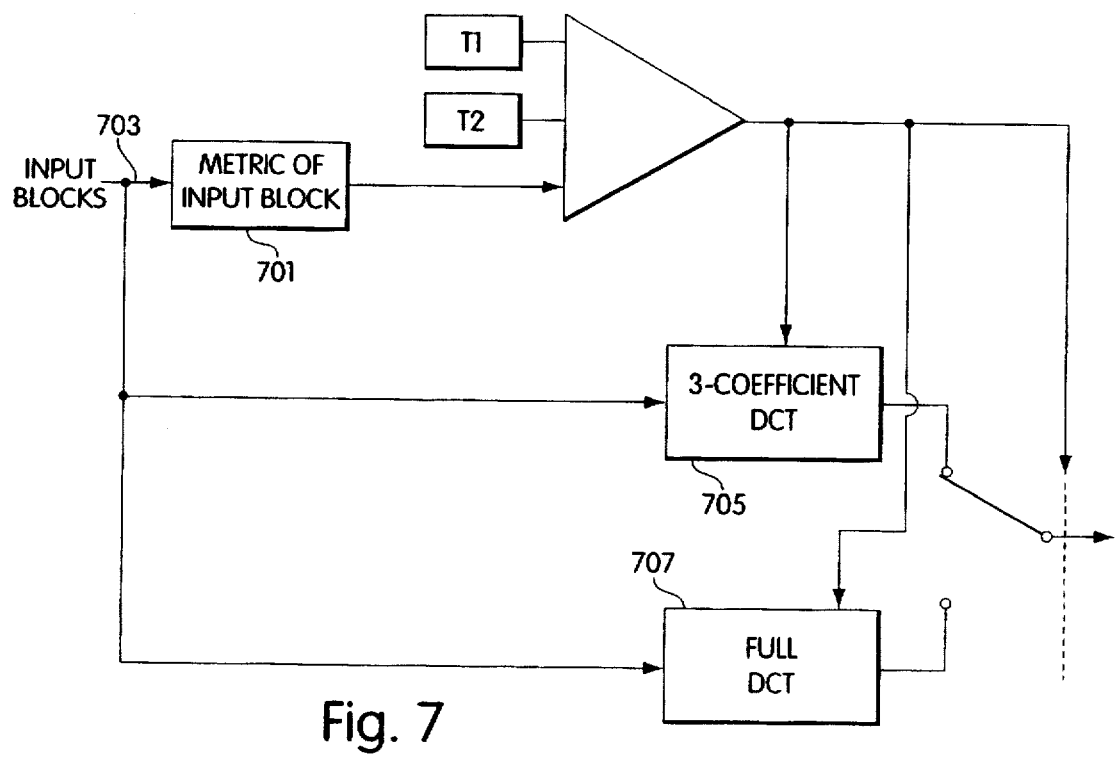
FIG. 7 is a block diagram of yet another apparatus for selectively switching between a reduced coefficient DCT and a full DCT.

In an alternative to the above-described selective switching method, the IDCT may operate on quantized coefficients. That is, the 3-coefficient DCT 401 may include quantization to produce quantized coefficient 409. This is desirable, if the fast 3-coefficient DCT is embedded in a hybrid coder, such as shown in FIG. 6. As can be seen from FIG. 6, even when performing full DCTs, an inverse DCT 601 is applied to the quantized coefficients 603 in any case to compute the quantized prediction error e'. Therefore, computation of the inverse DCT for error checking does not require additional steps or apparatus.

Another selective switching method suitable for input signals representative of moving video and used in connection with a hybrid coder (e.g., FIG. 6) is based on the root mean square (rms) value of the input signal sample values. This is an example of a metric of the input block. The rms value $M_{rms}$ is determined, 701, for each input block 703 to be transformed. This determination may be made by considering all the input signal sample values in the input block, or only a subset of the input signal sample values. In one embodiment, where N=8, only 16 input signal samples are used, rather than N×N=64 samples in one input block. The 3-coefficient DCT or other reduced coefficient DCT with selective switching may be performed as follows, in accordance with one embodiment of the invention:

If $M_{rms}<T1$, no DCT computation is carried out—the block is skipped;

if $T1=<M_{rms}<T2$, the fast 3-coefficient DCT 705 or other reduced coefficient DCT is carried out; and if $T2=<M$ a full DCT 707 is carried out.

Figure 2:
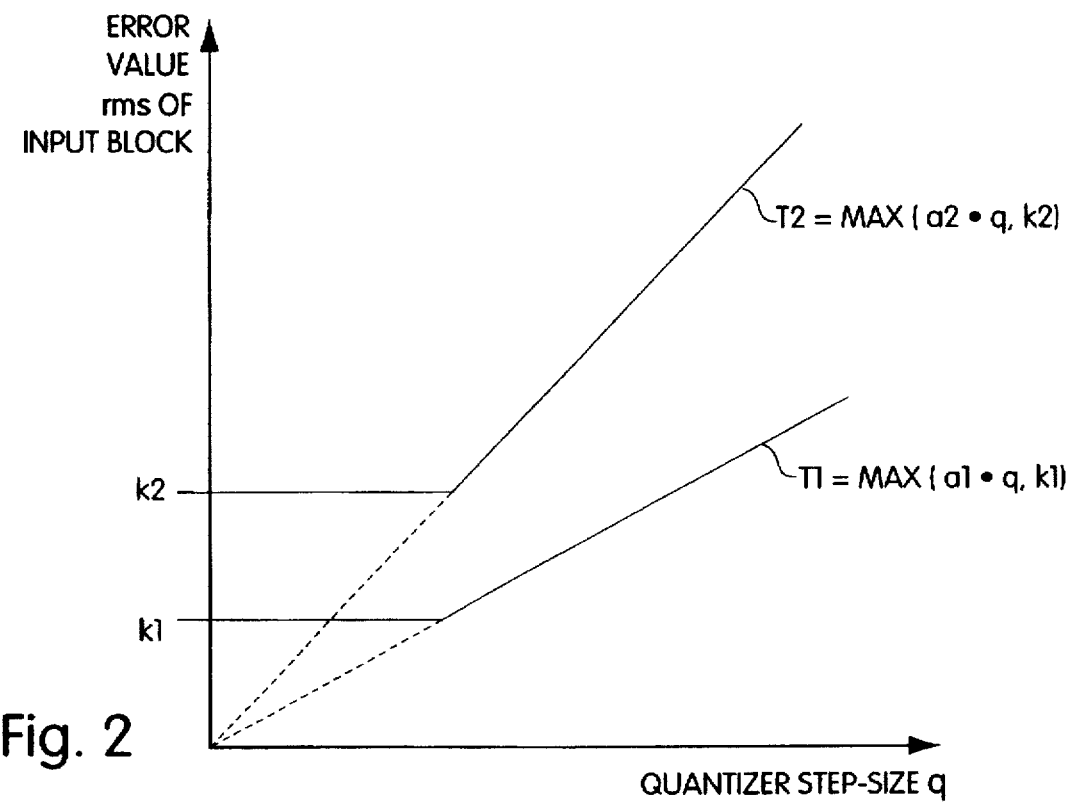
FIG. 2 is a graph of threshold values, showing how thresholds which vary with quantizer step are selected.

Thresholds T1 and T2 are selected as functions of quantizer step size used, as shown in FIG. 2. The four parameters a1, k1, a2 and k2 are adjusted to yield subjectively satisfying picture quality.

The present invention has been described and illustrated in connection with a number of specific examples. However, the foregoing description is not to be taken as limiting. Numerous variations and modifications contemplated as within the scope of the invention should now occur to those skilled in the art. Therefore, the scope of the invention is not to be limited except by the scope of the appended claims.

What is claimed is:

1. Apparatus for performing a three-coefficient discrete cosine transform on a block of N×N image samples, each image sample represented by a sample value, the apparatus comprising:

at least one summing unit connected to sum sample values of selected rows and columns in the block; and a linear arithmetic combination unit connected to receive the summed sample values, to form by linear arithmetic combination thereof coefficients $C_{00}$, $C_{01}$ and $C_{10}$, and to set all other coefficients $C_{mn}$, to a value of zero.

2. The apparatus of claim 1, wherein the selected rows and columns in the block include a first row, an Nth row, a first column and an Nth column.

3. The apparatus of claim 1, wherein the selected rows include an Sth row and a Tth row and the selected columns include a Uth column and a Vth column, wherein a sum of sample values of the Sth row is $S_{RS}$, a sum of sample values of the Tth row is $S_{RT}$, a sum of sample values of the Uth column is $S_{CU}$, and a sum of sample values of the Vth column is $S_{CV}$, and wherein the linear arithmetic combination unit forms coefficients in accordance with:

$$C_{00}=k_{00} \cdot (S_{RS}+S_{RT}+S_{CU}+S_{CV}),$$

$$C_{01}=k_{01} \cdot (S_{CU}-S_{CV}),$$

$$C_{10}=k_{10} \cdot (S_{RS}-S_{RT}),$$

wherein $k_{00}$, $k_{01}$ and $k_{10}$ are scaling factors.

4. The apparatus of claim 3, wherein N=8, S=U=1, T=V=8, $k_{00}=\frac{1}{4}$ and $k_{01}=k_{10}=\frac{21}{64}$.

5. Apparatus for performing a reduced coefficient discrete cosine transform on a block of N×N image samples, each image sample represented by a sample value, the apparatus comprising;

a linear arithmetic combination unit connected to receive a subset of K sample values, K<N×N, from among the sample values in the block, and to produce a linear arithmetic combination of substantially only the K sample values to form L coefficients, where L<=K, and wherein the K sample values lie substantially at positions within the block corresponding to large amplitudes of basis functions represented by the L coefficients.

6. The apparatus of claim 5, further comprising:

a summation unit which receives the K sample values and produces at least L sums; and wherein the linear arithmetic combination unit forms the L coefficients by a linear arithmetic combination of substantially only the L sums.

7. Apparatus for performing a discrete cosine transform on an input block of N×N image samples, each image sample represented by a sample value, the apparatus comprising:

means for performing a reduced coefficient discrete cosine transformation on the input block to form L of N×N first coefficients, including means for filling the N×N−L first coefficients not produced with a value of zero;

means for performing an inverse discrete cosine transformation on the produced first coefficients to form a reconstructed block;

means responsive to the reconstructed block and the input block for forming an error value and further for testing the error value against a predetermined threshold and producing a control output responsive to the test;

means responsive to the control output, for performing an N×N coefficient discrete cosine transform on the input block to form second coefficients, when the error value is not less than the predetermined threshold; and means for outputting the second coefficients, if the second coefficients are formed, but otherwise outputting the first coefficients.

8. The apparatus of claim 7, further comprising:

a quantizer, receiving the first coefficients formed and providing to the means for performing an inverse discrete cosine transformation quantized first coefficients.

9. The apparatus of claim 7, wherein the means for forming an error value further comprises:

means for determining a mean squared difference between sample values in the input block and corresponding samples in the reconstructed block, to form the error value.

10. The apparatus of claim 7, wherein the means for forming an error value further comprises:

means for determining a mean absolute difference between sample values in the input block and corresponding samples in the reconstructed block, to form the error value.

11. The apparatus of claim 7, wherein the means for forming an error value further comprises:

means for determining a maximum difference between sample values in the input block and corresponding samples in the reconstructed block, to be the error value.

12. Apparatus for performing a discrete cosine transform on an input block of an N×N image samples, each image sample represented by a sample value, the apparatus comprising:

means for measuring a metric of the input block connected to receive the input block and to produce the metric further for testing the metric against a first threshold and producing a control output indicative of a relationship between the metric and the first threshold;

means for performing a reduced coefficient discrete cosine transformation on the input block to form coefficients, responsive to the relationship indicated by the control output; and means for performing an N×N coefficient discrete cosine transformation on the input block to form coefficients, responsive to the relationship indicated by the control output.

13. The apparatus of claim 12, wherein the metric is a root-mean-square of the sample values in the input block.

14. The apparatus of claim 12, wherein the metric is a standard deviation of the sample values in the input block.

15. The apparatus of claim 12, wherein if the metric bears a predetermined relationship to a second predetermined threshold, then the control output inhibits operation of both the means for performing a reduced coefficient discrete cosine transform and the means for performing an N×N coefficient discrete cosine transform.

* * * * *